G. J. MURPHY.
SPRING WHEEL.
APPLICATION FILED JAN. 27, 1914.
1,134,218.
Patented Apr. 6, 1915.
2 SHEETS—SHEET 1.
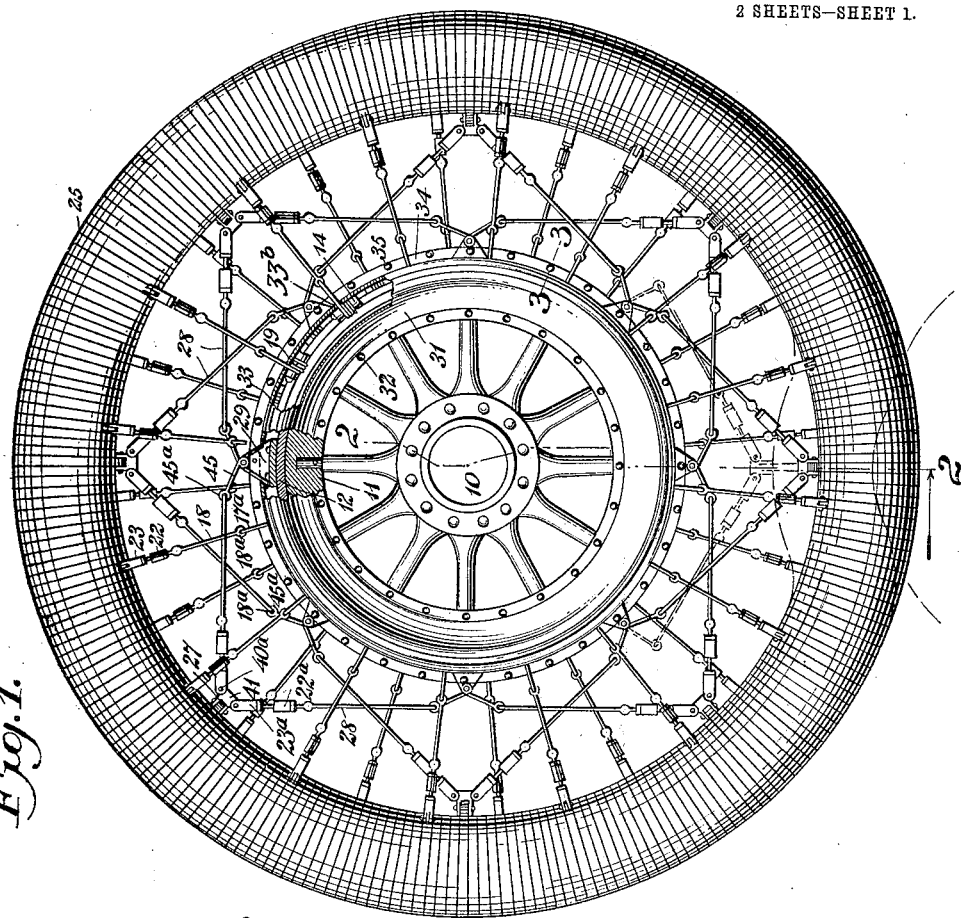
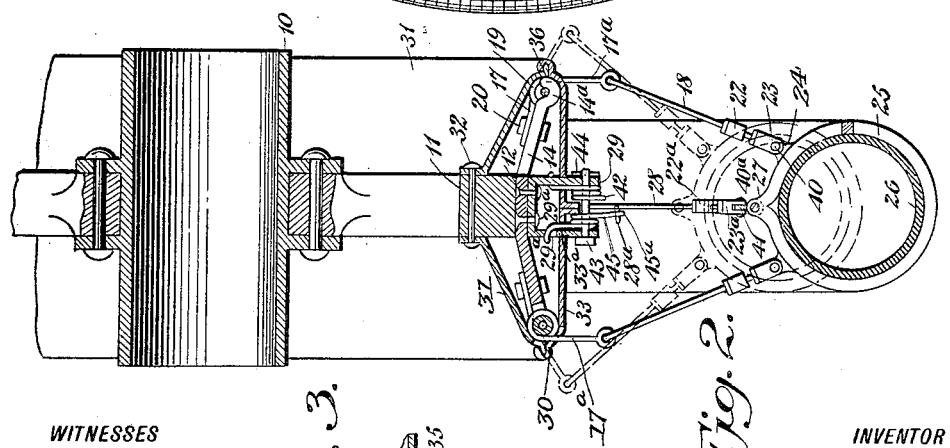
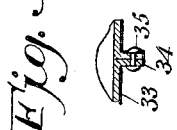
WITNESSES
INVENTOR
George J. Murphy
BY
ATTORNEYS G. J. MURPHY.
SPRING WHEEL.
APPLICATION FILED JAN. 27, 1914.
1,134,218.
Patented Apr. 6, 1915.
2 SHEETS—SHEET 2.
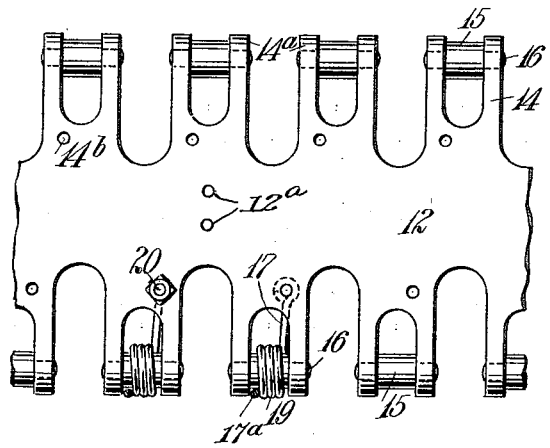
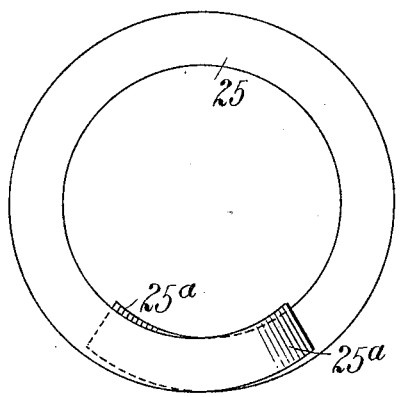
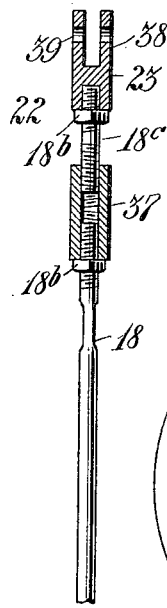
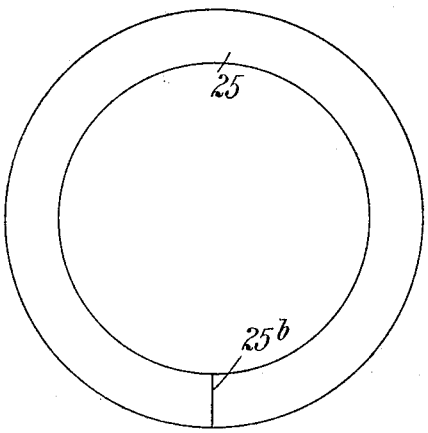
WITNESSES
Edw. Thorpe
J. L. McAuliffe
INVENTOR
George J. Murphy
BY Munn & Co
ATTORNEYS

UNITED STATES PATENT OFFICE.

GEORGE J. MURPHY, OF BARADERO, ARGENTINA.

SPRING-WHEEL.

1,134,218.

Specification of Letters Patent.

Patented Apr. 6, 1915.

Application filed January 27, 1914. Serial No. 814,798.

*To all whom it may concern:*

Be it known that I, GEORGE JOSEPH MURPHY, a British subject, of the city of Dublin, Ireland, and a resident of Baradero F. C. C. A., Buenos Aires, Argentina, have invented a new and Improved Spring-Wheel, of which the following is a full, clear, and exact description.

My invention relates to a spring wheel adapted for use on automobiles and other vehicles, and more particularly relates to a wheel in which the tire section is in the form of an annular spring coil, there being a separate hub section, and spoke elements to form a connection between the hub section and the coiled spring tire.

The invention will be particularly explained in the specific description following.

Reference is to be had to the accompanying drawings forming a part of this specification, in which similar characters of reference indicate corresponding parts in all the views.

Figure 1 is a side elevation partly in section of a wheel embodying my invention; Fig. 2 is a partial transverse vertical section through the wheel, the section being indicated by the dotted line 2—2 of Fig. 1, one convolution only of the coiled spring tire being shown, in the interest of clearness; Fig. 3 is a detail in transverse vertical section, of the housing for the inner rim; Fig. 4 is a fragmentary developed view of the rim of the hub section; Fig. 5 is a detail sectional view of one of the spoke elements; Fig. 6 is a diagrammatic end view of the coiled spring forming the tire section, before being bent into ring-form, and before the ends of the spring are united; and Fig. 7 is a similar view to Fig. 6, showing the coil expanded and the ends joined.

In forming a wheel in accordance with my invention an inner or hub section 10 is provided, here shown in the form of an artillery type wheel. On the felly 11 of the hub section is a rim or inner metallic tire 12, which is formed at each side with forks presenting pairs of arms 14, the said pairs of arms of the respective sides being preferably staggered. The outer ends of the arms 14 are formed with hooks $14^a$, presenting concave depressions facing radially inward or toward the axis of the wheel. Between the arms 14 are friction rollers 15, the journals 16 of which are received in the depressions presented by the hooks $14^a$.

Spokes 18 are provided at the sides of the rim 12, and connected with said rim and with a coiled spring tire hereinafter described. The connection of the spokes with the rim 12 is effected through the medium of spring coils 19. Each coil 19 encircles one of the friction rollers 15, and one arm 17 of the coil is secured by bolts 20 to the rim, the bolts passing through holes $14^b$ in said rim. The other arm $17^a$ of the spring coil 19 has an articulated connection with a spoke 18, by an eye 21 on the arm $17^a$, and a corresponding eye $18^a$ on the spoke, said eyes being interengaged with each other. As will be seen in Fig. 2, the spokes 18 and the spring arm $17^a$ are at an angle to each other, this relation being maintained by the tension of the spring 19, and thus a thrust on the spoke will not result in a direct end thrust on the spring arm, but on the contrary there will be a flexure at the articulation $18^a$, 21.

Each spoke near the outer end is provided with a turn-buckle 22, as shown in Fig. 5, and as hereinafter more particularly referred to, for varying the tension of the spring 19 and thus increasing or decreasing the rigidity of the spokes 18.

At the outer ends the spokes 18 terminate in forked links $23^a$ for engaging lugs 24 on a continuous coiled spring 25 constituting the body of the tire, said body receiving within the same any suitable inner tube 26, as desired, and in practice also having any desired form of tread surface. The coiled spring 25 may be produced of any desired strength according to the character of the vehicle or the load the wheel is expected to sustain, and it is so formed as to present close coils at the tread surface as well as at the inner periphery. Thus in practice, the cross section of the material forming the coiled spring will be so formed at each convolution as to vary in width and taper from the outer periphery or tread inward, that is, toward the inner periphery. The lugs or loops 24 may be produced in any suitable manner on the convolutions.

The respective annular series of spokes 18 are disposed at each side of the radial center of the wheel, and at the radial center, or substantially so, lugs or loops 27 are produced, extending radially inward from the coiled spring 25, to which lugs are connected stays 28. The stay members are inclined and connect alternately with the coiled spring tire 25 through the medium of the lugs 27, and with the rim 12, the latter being provided with brackets 29 to which the stays are resiliently secured, as hereinafter described. The said brackets 29 may be secured by rivets 29[a] which pass through holes 12[a] provided in the rim 12.

A housing or casing is provided to inclose the rim 12 and extend around the arms 14, the rollers 15, the lateral spring coils 19 of the spokes, and the securing bolts 20. The housing, which is designated generally by the numeral 30, comprises annular plates or rings 31 at each side of the felly 11, said plates being flanged and secured to the felly by transverse bolts 32. The said plates form the inner side of the housing, the outer side being formed of exterior annular plates 33, the meeting edges of which are formed with flanges 34 disposed radially outward on the exterior of the housing, about on the median line or radial center of the wheel, and united by rivets 35 or their equivalents. The connection of the housing parts is completed by forming annular crimped seams 36 uniting the outer edges of the inner annular plates 31 and outer annular plates 33. The outer plates are formed with suitable radial holes 33[a] for the brackets 29, and with additional holes 33[b] for the spring arms 17[a].

The turn buckle 22, as shown in detail in Fig. 5, comprises a sleeve 37, having right and left threads engaging corresponding threads on the sections 18, 18[c] of the spokes, the outer section 18[c] having threaded engagement with the connecting bracket 23. The adjusted position of the turnbuckle is maintained by lock nuts 18[b]. The brackets 23 are forked at their outer ends as at 38, the forks having transverse rivet holes 29 to receive the rivets 40 for engaging the brackets 23 with the lugs 24 on the coiled spring tire.

The diagrammatic view, Fig. 6, shows the ends 25[a] of the convolutions which will be brought together when the coil is bent into ring form, overlapped, it being my design to make the coils initially of less diameter than in the finished tire, and to expand the convolutions as represented in Fig. 7, with the ends 25[a] brought together and joined as at 25[b], (Fig. 7.)

Connection between the stays 28 and the coiled spring tire 25 is effected by means of turn-buckles 22[a] and forked links 23[a] similar to the corresponding parts employed with the spokes 18, said links being secured by pivots 40[a] to blocks 41, the blocks being forked and suitably secured to lugs 27 formed on certain convolutions of the tire 25. The stays are arranged in pairs, two stays being united to a block 41 and diverging inwardly. The inner ends of the stays 28 are connected to the U-shaped brackets 29 through the medium of coiled springs 42. The coils of said springs wind about a pin 43, which may be secured by a cotter pin 44. One arm of each spring is shown as engaging in an orifice 29[a] (Fig. 2) of a bracket 29; the other arm 45 of each spring has an articulated connection with a stay 28, by means of interengaging eyes 45[a], 28[a].

By the described arrangement of the stays and spokes and the springs appurtenant thereto, these elements respond to the deflection of the tire at the tread due to any inequalities in the road, and permit the tire to more readily absorb the shock.

Having thus described my invention, I claim as new, and desire to secure by Letters Patent:

1. A wheel comprising an inner hub section having a rim, an outer tire section, and intermediate spoke elements, the rim of the hub section presenting lateral forks at each side, and the spoke elements including spring coils disposed peripherally around the wheel, there being friction rollers within the spring coils, said friction rollers being journaled in the forks of the rim.

2. A wheel comprising an inner hub section having a rim, an outer tire section, and intermediate spoke elements at each side of the wheel, the rim of the hub section having pairs of arms formed at their outer ends with hooks presenting concave depressions disposed in the direction of the axis of the wheel, the spokes having spring coils disposed peripherally around the wheel, and there being friction rollers within the said coils, said rollers being provided with journals having bearings in the depressions presented by the hooks.

3. In a spring wheel, a hub section, an outer tire section, spokes connected at their outer ends with the tire section, coiled springs connected with the rim and with the said spokes, the spokes being arranged at each side of the wheel, stays disposed at approximately the radial center of the wheel, the spokes being connected at their outer ends with the tire section, and coiled springs connected with the rim and with the said stays.

4. A resilient wheel comprising an inner hub section having a rim formed with an annular series of seats at each side, a tire section, series of spokes at each side of the wheel, said spokes being connected at their outer ends with the tire section, series of coiled springs having their convolutions arranged laterally and presenting arms extending radially outward, the said arms of the springs having an articulated connection with the inner ends of the spokes, said springs being mounted on the seats of the rim section, a series of stays connected at their outer ends with the rim of the tire section and extending inwardly therefrom, and coiled springs mounted on the rim section and provided with arms having an articulated connection with the inner ends of the stays.

In testimony whereof I have signed my name to this specification in the presence of two subscribing witnesses.

GEORGE J. MURPHY.

Witnesses:
HANNELL HEALY,
MIGUEL J. BARMAN.